United States Patent [19]

Friebel et al.

[11] Patent Number: 4,598,886
[45] Date of Patent: Jul. 8, 1986

[54] DOUBLE PARASOL, FAVORABLE INTERFERENCE AIRPLANE

[75] Inventors: Gottfried O. Friebel, Bellevue; Robert M. Kulfan, Kirkland, both of Wash.

[73] Assignee: The Boeing Company, Seattle, Wash.

[21] Appl. No.: 65,792

[22] Filed: Aug. 13, 1979

[51] Int. Cl.$^4$ .................. B64C 3/10; B64D 27/18; B64D 29/02
[52] U.S. Cl. .................. 244/15; 244/45 R; 244/55; 244/35 A
[58] Field of Search .............. 244/15, 13, 34 R, 34 A, 244/35 RA, 45 R, 123, 55, 198; D12/80, 71, 72

[56] References Cited

U.S. PATENT DOCUMENTS

| | | | |
|---|---|---|---|
| D. 85,198 | 9/1931 | Papke | D12/80 |
| 1,063,805 | 6/1913 | Krause | 244/198 |
| 1,314,227 | 8/1919 | Tolman | 244/35 R |
| 1,913,556 | 6/1933 | Mersch | 244/35 R |
| 2,950,879 | 8/1960 | Smith | 244/198 |
| 2,967,030 | 1/1961 | Whitcomb | 244/198 |
| 3,152,775 | 10/1964 | Boyd | 244/130 |
| 3,310,262 | 3/1967 | Robins et al. | 244/45 R |
| 3,370,810 | 2/1968 | Shevell et al. | 244/199 |
| 3,391,884 | 7/1968 | Carhartt | 244/34 R |
| 3,625,459 | 12/1971 | Brown | 244/35 R |
| 3,744,745 | 7/1973 | Kerker | 244/199 |
| 4,067,518 | 1/1978 | Paterson | 244/198 |
| 4,168,044 | 9/1979 | Rethorst | 244/1 N |

FOREIGN PATENT DOCUMENTS

0681633 5/1930 France .
0786778 11/1957 United Kingdom .

OTHER PUBLICATIONS

Boyd, (1965), "Optimal Utilization of Supersonic Favorable Interference to Obtain High Lift-Drag Ratio", AIAA paper 65-752, Nov. 1965.
Chen et al., "Body Underlifting Wing", JAS, vol. 28, No. 7, pp. 547-562, Jul. 1961.
Mysliwetz, "Supersonic Interference of a Body Under a Wing", Boeing Document D6-5207, Jul. 1960.
Mysliwetz, "Supersonic Interference Lift of a Body-Wing Comb.", AIAA Journal, vol. 1, pp. 1432-1434, Jun. 1963.
Woodward, Pressure and Forces on Wings and Bodies in Close Proximity at Supersonic Speeds, Boeing Doc. D6-8927, Apr. 1962.
"Air Force Tests Parasol Wing", Design News, 3-1-9-1978, p. 59.
Kulfan, Application of Hypersonic Favorable Aerodynamic Interference Concepts to Supersonic Aircraft", AIAA paper 78-1458, Aug. 21-23, 1978.
Morris et al., "Aerodynamic Characteristics in Pitch of a Modified Half Ring Wing Body Combination and a Swept . . . ", NASA TMX 1551, 1968.
Swanson et al., "Cylindrical Wing-Body Configuration for Space Limited Applications", J. Spacecraft, vol. 11, No. 1, Jan. 1974.
Morris et al., "Aerodynamic Characteristics of a Parasol-Wing-Body Combination . . . at Mach Numbers from 3 to 4.63", NASA TND 4855, 1968.
Kocivar, "Parasol Wing", Pop. Sci., Sep. 1979, p. 102.

*Primary Examiner*—Galen Barefoot
*Attorney, Agent, or Firm*—B. A. Donahue; R. E. Suter

[57] ABSTRACT

An aircraft intended to fly at supersonic Mach mnumbers is disclosed. The aircraft utilizes a double parasol wing arrangement, with a power plant nacelle located under the wing on each side of the fuselage. Each nacelle is located at the focus of a reflection parabola formed by the undersurface of each wing. In flight the shock wave pressure field created by the nacelles is reflected and redirected by the parabolic wing surface and thereby transformed into beneficial lift. The separation distance between each wing and its respective nacelle is arranged to maximize multiple reflections to thereby further enhance the lift created.

5 Claims, 12 Drawing Figures

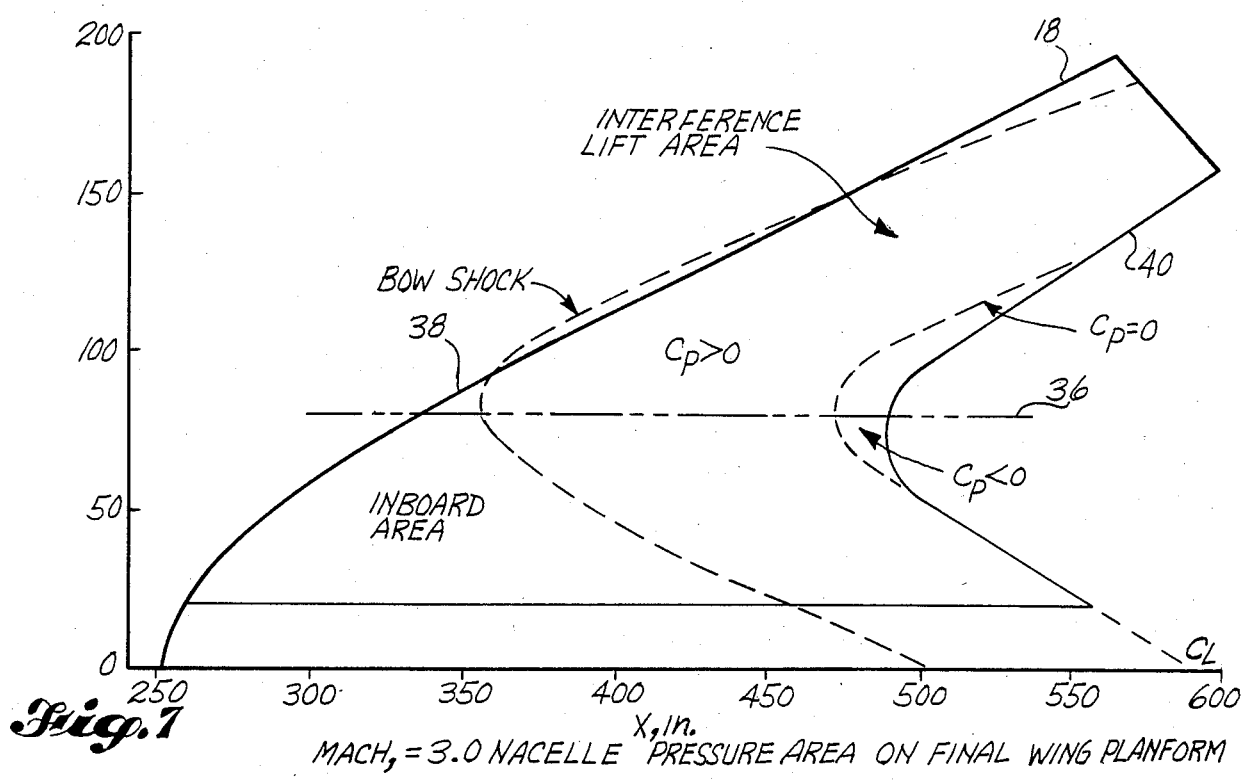
Fig. 7 MACH₁ = 3.0 NACELLE PRESSURE AREA ON FINAL WING PLANFORM
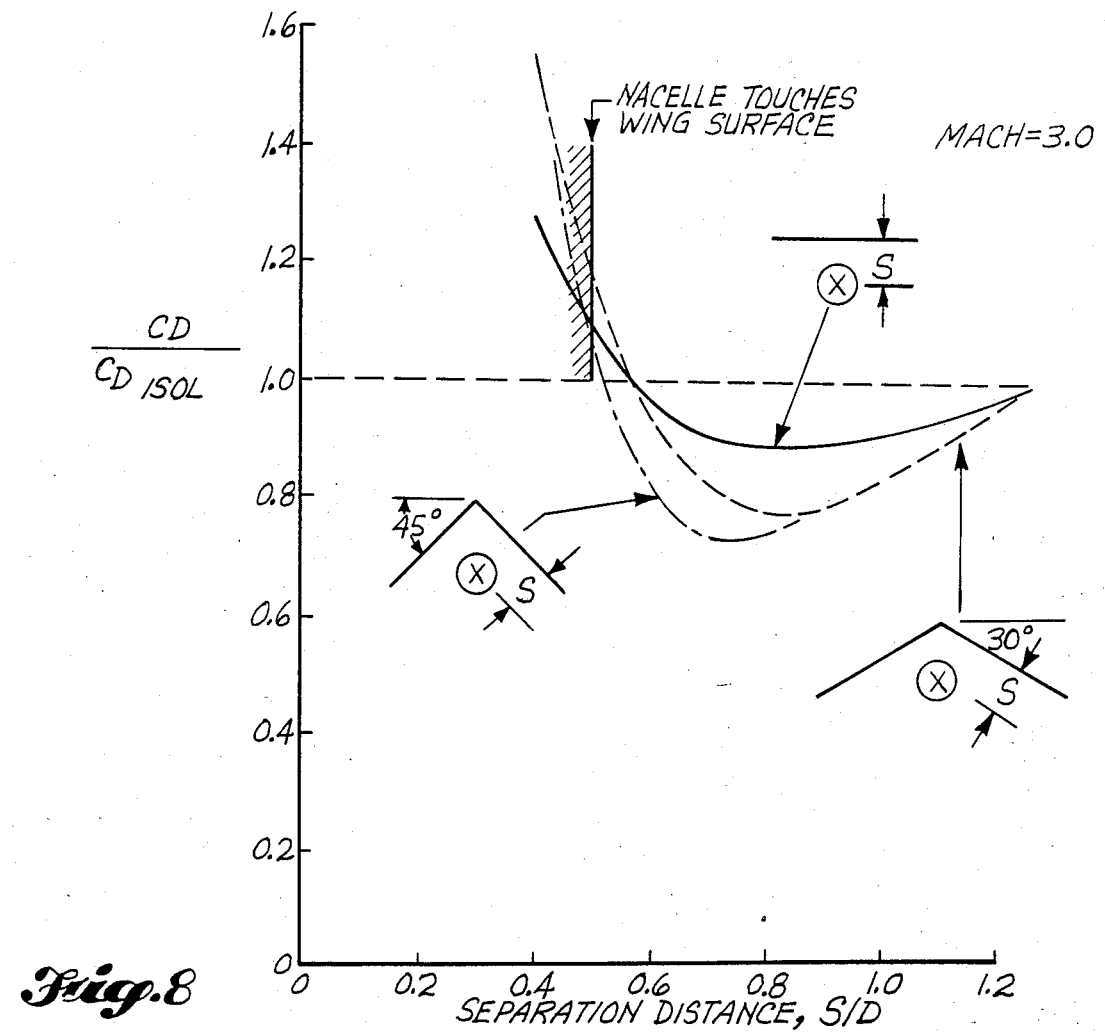
Fig. 8

EFFECT OF BODY SLENDERNESS ON WING/BODY SEPARATION

EFFECT OF INLET DIAMETER ON OPTIMUM WING/BODY SEPARATION

EFFECT OF NACELLE AREA GROWTH ON INTERFERENCE LIFT

DOUBLE PARASOL, FAVORABLE INTERFERENCE AIRPLANE

BACKGROUND OF THE INVENTION

1. Field of the Invention

This invention relates generally to aircraft capable of flight at supersonic Mach numbers and, more particularly, to aircraft of the type described which utilize favorable aerodynamic interference effects which reduce drag and increase lift to provide efficient extended supersonic cruise. Such aircraft have both military and commercial utility.

2. Background of the Invention

Existing supersonic aircraft typically employ thin, highly swept wings and slender bodies which utilize an integrated propulsion system in an attempt to produce aerodynamically efficient designs. However, with such conventional designs, the lift to drag ratio decreases significantly at higher Mach numbers. This is due, in part, to decreased lifting effectiveness of the wing surfaces and increased wave drag at such velocities.

It has long been theorized that these difficulties could be alleviated if such aircraft were able, in some manner, to utilize mutual interactions of the flow fields generated at higher Mach numbers to augment lift and reduce drag. Initially it was believed this could be accomplished by reacting shock waves against existing wing designs to produce an upward or lifting force component. To create the necessary shock wave(s) at the appropriate location(s), it was suggested that volume elements, such as non-flight functional wedges or semi-cones, be positioned on the lower surface of the wing. This design has not proven to be practical because of excessive drag produced by such bodies. Another design that offered some promise, at least in theory, was the semi-ring wing, which utilized a full body or fuselage suspended beneath a wing formed as a semi-annulus with the body at its diametrical center. Although this arrangement is capable of capturing shock disturbances beneath the wing, the structural requirements of the member needed to connect the large body to the wing caused a significant drag increase which substantially offset drag reduction of the favorable interference effects. This fact and associated structurual problems of the connecting member proved this design impractical. Other designs involving a wing-suspended fuselage suffer similar disadvantages. Another disadvantage occurs because of the size of the fuselage body generally associated with such designs. That is, the fuselage-wing separation distance necessary for optimum wave drag cancellation effects becomes too large to permit optimum multiple wave reflections. Since multiple reflections are a significant factor in the augmentation of lift and wave drag cancellation is a significiant factor in drag reduction, benefits of these designs are inherently limited. Various other proposed designs such as the wave rider, the Buseman biplane and the Nonweiler wing, while offering theoretical promise, have produced no practical aircraft.

It is, accordingly, an object of the present invention to provide a practical, favorable interference aircraft that overcomes these and other disadvantages and limitations of the prior art.

It is another object of the invention to provide a practical, favorable interference aircraft that requires no single function elements to produce the necessary pressure fields.

It is a further object of the invention to provide a practical, favorable interference aircraft that utilizes the pressure fields generated by wing-suspended engine nacelles reacting against parabolically curved wings to augment lift and reduce drag for efficient, extended, supersonic cruise.

It is another object of the invention to produce a practical, favorable interference aircraft that utilizes wing mounted nacelles designed to optimize pressure field generation.

It is still another object of the invention to provide a practical, favorable interference aircraft that utilizes a wing plan form which reduces negative pressure effects and associated drag.

SUMMARY OF THE INVENTION

Briefly, these and other objects are achieved in accordance with the structural aspects of an example of the invention in which a wing member extends from each side of the fuselage. Each wing member is curved in the span-wise direction to form a lower surface reflection parabola. An engine nacelle is located at the focus of the reflection parabola created by each wing so that portions of the pressure field created by each nacelle, are redirected by the wing lower surface and transformed into beneficial lift. The parabolic curvature of the wings and the wing/nacelle separation distance, are determined so as to maximize wave cancellation effects and thereby reduce drag. The wing top plan form is designed so that the leading edge of each wing generally matches the bow shock produced by the respective nacelle and the trailing edge minimizes negative interference pressures. The fuselage is area-ruled to optimize fuselage/nacelle and fuselage/wing interference effects.

Further details of these and other novel features and their operation and cooperation as well as additional objects and advantages of the invention will become apparent and be best understood from a consideration of the following description taken in connection with the accompanying drawing which is provided by way of illustrative example only.

BRIEF DESCRIPTION OF THE DRAWING

FIG. 2 is a front view of the novel favorable interference aircraft embodying the inventive principles.

FIG. 3 is a top view of the aircraft of FIG. 1.

FIG. 4 is a side view of the aircraft of FIG. 1.

FIG. 5 is a sectional view along lines 5—5 of FIG. 2 to show the novel nacelle contour as well as its location and orientation with respect to the wing.

FIG. 8 illustrates the effect of parasol anhedral on nacelle wave drag.

DETAILED DESCRIPTION OF THE PREFERRED EMBODIMENT

Figure 1:
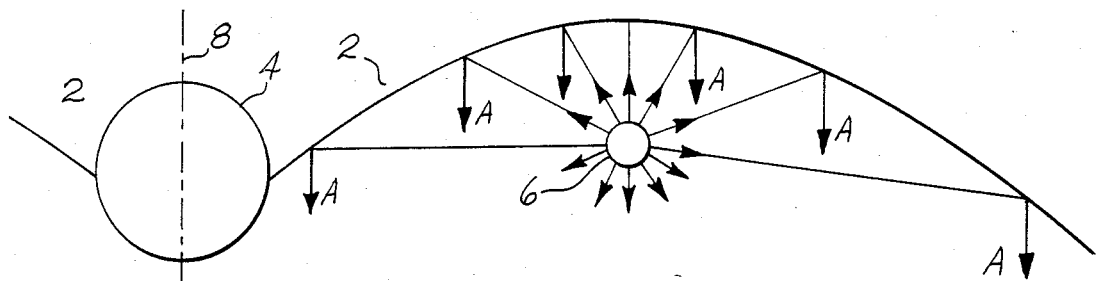
FIG. 1 schematically illustrates one principle of the invention.

As used herein, the following abbreviations and symbols have the meaning listed.
$C_P$: pressure coefficient
l: length
D: diameter, drag
$D_I$: inlet diameter
$C_D$: drag coefficient
$C_{DISOL}$: isolated drag coefficient
$C_W$: wave drag coefficient
$D_M$: maximum diameter
$\bar{D}$: equivalent diameter
h: diverter height
$\beta$: $\sqrt{m^2-1}$
$\Gamma$: dihedral
S: area
$\Delta$: incremental
$C_L$: lift coefficient With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show or discuss structural details of the apparatus in more detail than is necessary for a fundamental understanding of the invention. The description taken with the drawing will make it apparent to those skilled in the mechanical arts how the invention may be embodied in practice. Specifically, the detailed showing is not to be taken as a limitation upon the scope of the invention which is defined by the appended claims forming, along with the drawing, a part of the specification.

One of the basic principles underlying the practical, favorable interference aircraft of the invention is illustrated in FIG. 1. A pair of parabolic reflection surfaces 2, created by the undersurface of a pair of wings (not shown) extend from a fuselage body 4. A power plant nacelle 6 (only one shown), located at the focus of each parabolic surface 2 produces a pressure field, denoted by arrows A. As shown, as upwardly and outwardly directed portions of pressure field A impinge upon parabolic reflection surface 2, they are reflected, and thereby redirected, to produce a component of force acting in a direction to produce lift. This arrangement is, of course, symetric about a fuselage center line 8. The application of this principle to the design of the practical, favorable interference aircraft, may be best seen with reference to FIGS. 2, 3, 4 and 5. It should be noted that while the preferred embodiment represents an aircraft having a gross takeoff weight of approximately 26,000 pounds and a design Mach number of three, the principles and design criteria disclosed and claimed herein may be applied to aircraft having other design parameters without departing from the spirit and scope of the invention.

Referring now to FIGS. 2, 3, 4 and 5, an aircraft generally designated 10, is seen to include a centrally located main body or fuselage 12 from which extends the conventional tricycle-type landing gear assembly 14. Since assembly 14 forms no part of the inventive concept, it will not be described in further detail. Symetrically arranged on opposite sides of an axial center line 16 of fuselage 12 is a wing, generally designated 18. Each wing 18 carries an engine 20 surrounded by a nacelle 22, by means of a support member 24. As seen in FIG. 2, each wing 18 may include an inboard, parabolically curved portion 26 the inboard end of which is faired smoothly into fuselage 12. Each wing further includes a substantially flat, central portion 28 having one end faired smoothly into the other end of inboard portion 26 and its other end faired smoothly into an outboard, span-wise parabolically curved portion 30. Inboard portion 26 is curved in the span-wise direction along the line of a parabola 32 (shown in dotted line). Similarly, outboard portion 30 is curved in the span-wise direction along the line of another parabola 34, (shown in dotted line). The focus of each parabola 32, 34 is the axial center line 36 of the respective nacelle 22. As seen in FIG. 3, the length of nacelle 22 is substantially equal to the local wing chord length. Central portion 28 is provided to create the necessary wing span for the particular design weight and parameters of the aircraft under consideration and produces no significant distortion of the reflected lift principles illustrated in FIG. 1. As will be apparent to those skilled in the art, changes in the desired gross weight from that of the preferred embodiment would result in consistent changes in not only wing span, but also other specific weight-dependent demensions as may be disclosed herein. However, it is equally apparent, that the overall inventive combination would remain unchanged for any such design modifications and are therefor intended to be covered herein.

Figure 6:
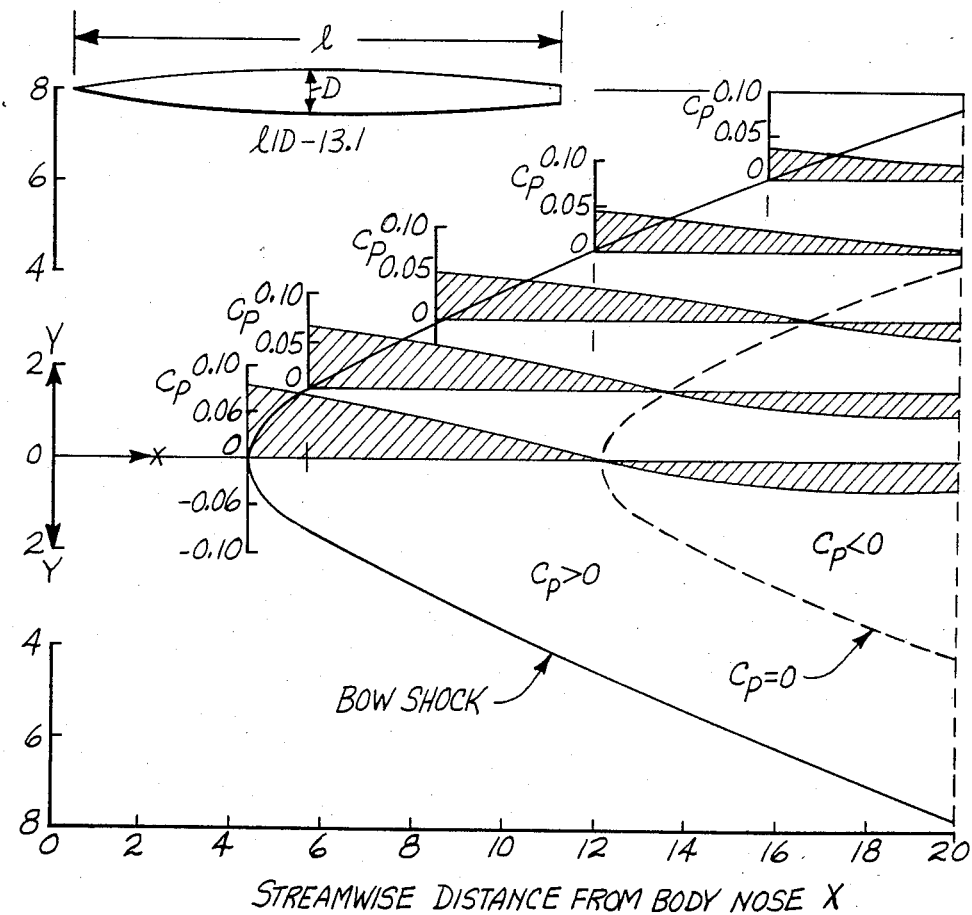
FIG. 6 illustrates a theoretical nacelle pressure distribution on a plane above the nacelle.
Figure 7:
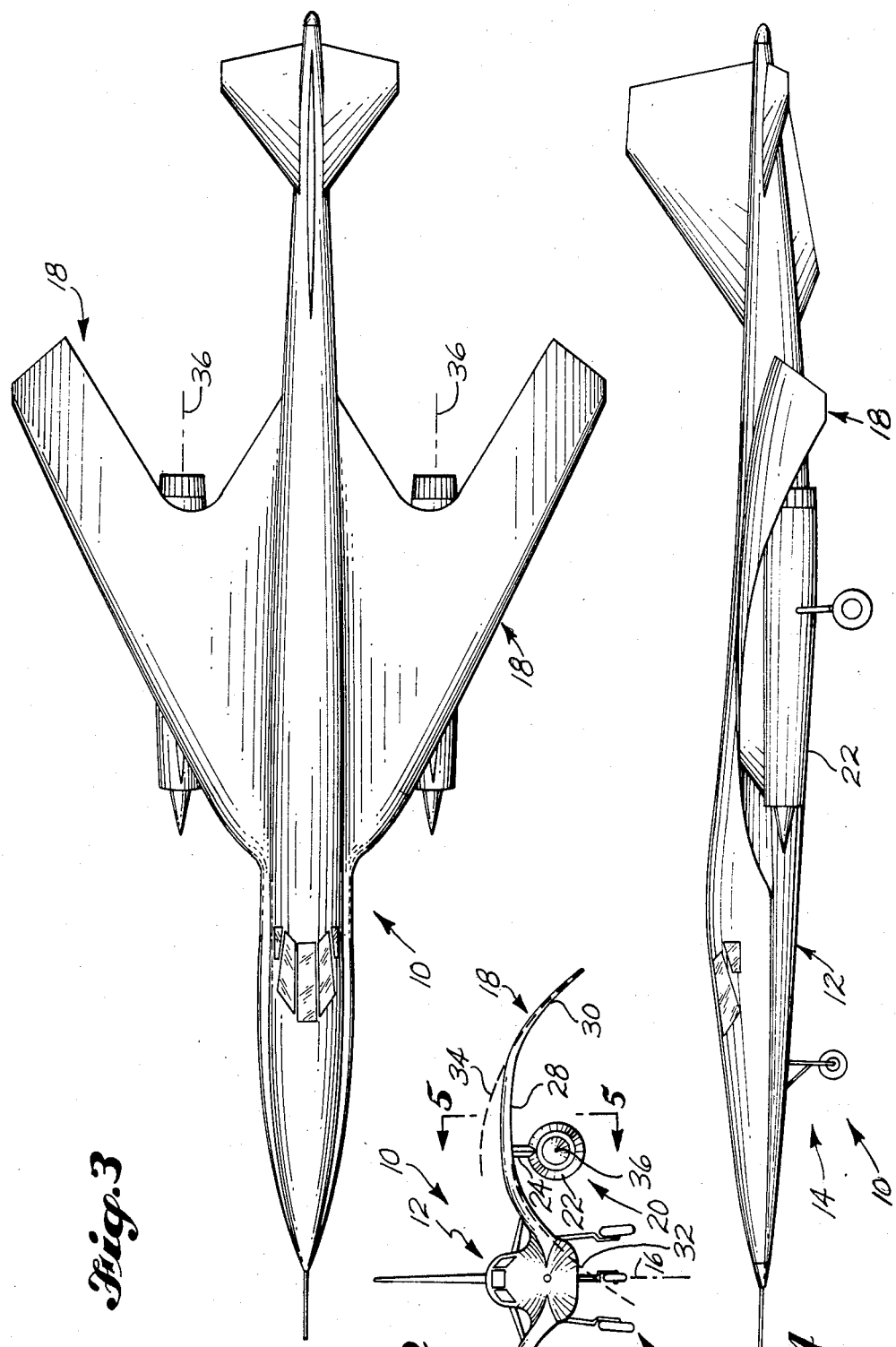
FIG. 7 illustrates the wing top plan form of the novel favorable interference aircraft with a theoretical nacelle pressure distribution superimposed thereon.
Figure 9:
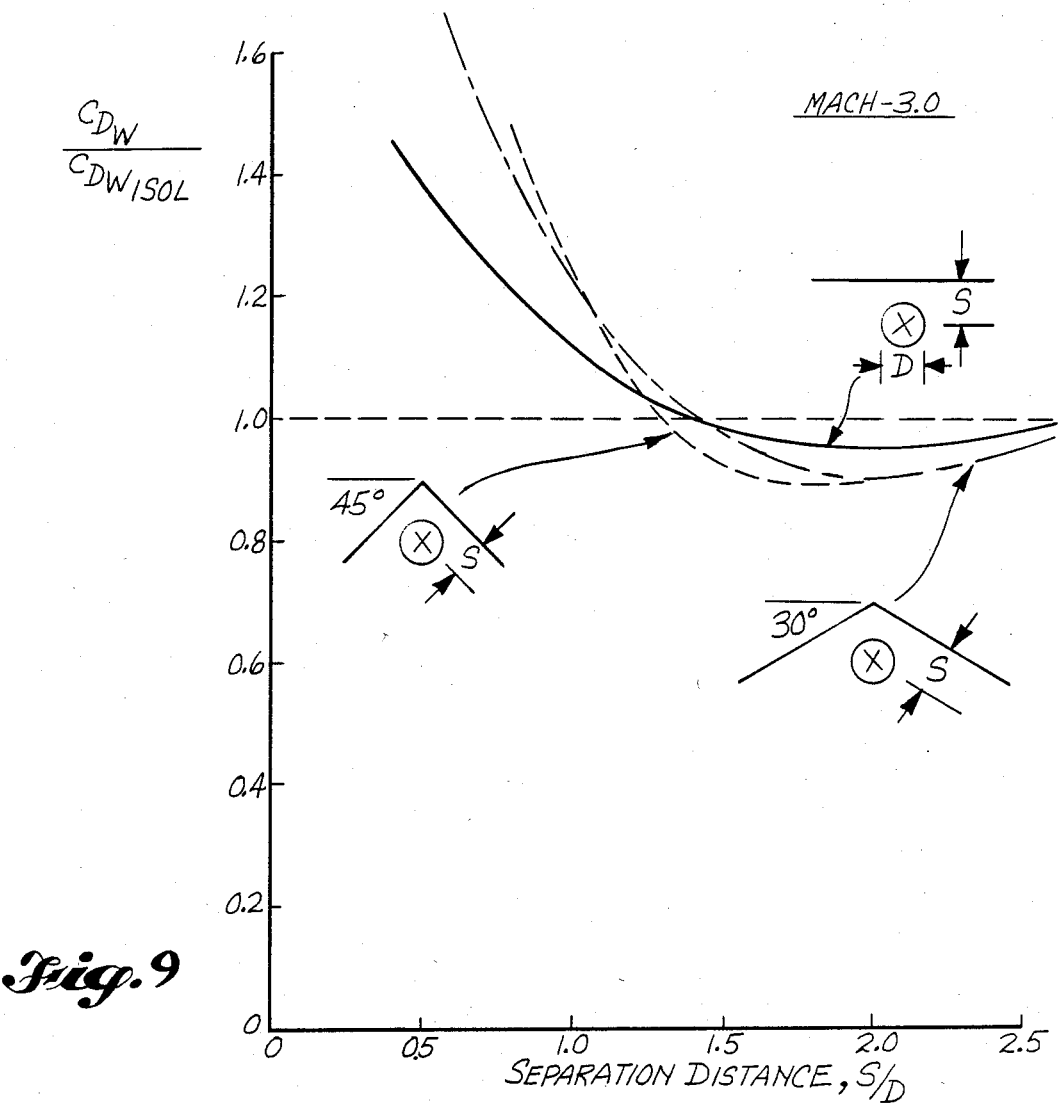
FIG. 9 is a plot similar to FIG. 8 illustrating the effect of parasol lateral anhedral on fuselage wave drag.
Figure 10:
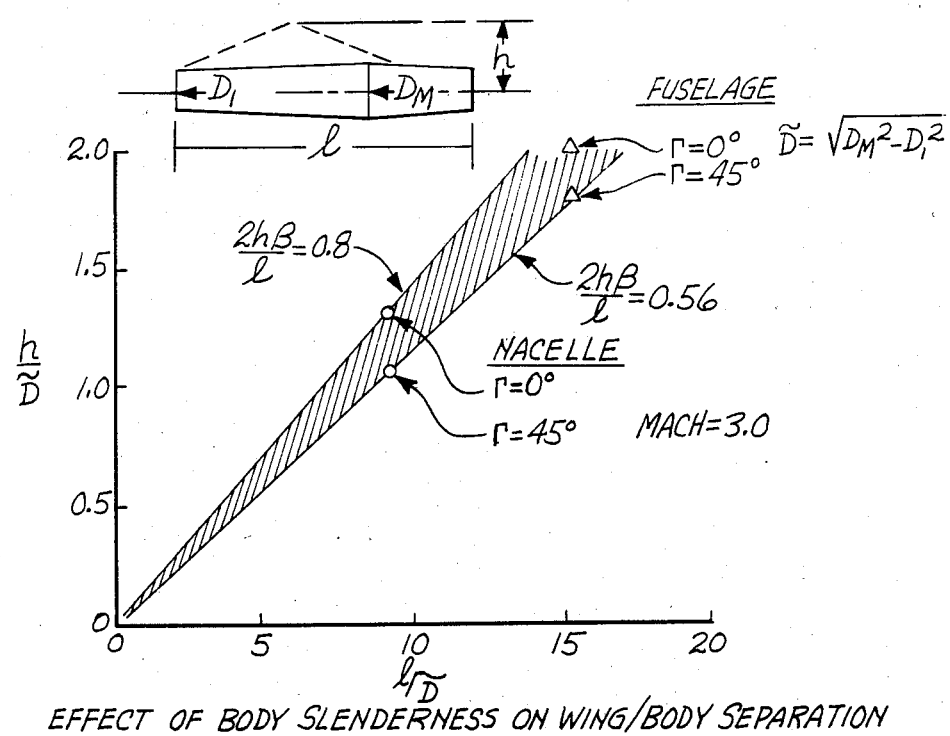
FIG. 10 illustrates the theoretical effect of body fineness ratio on optimum separation distance.
Figure 11:
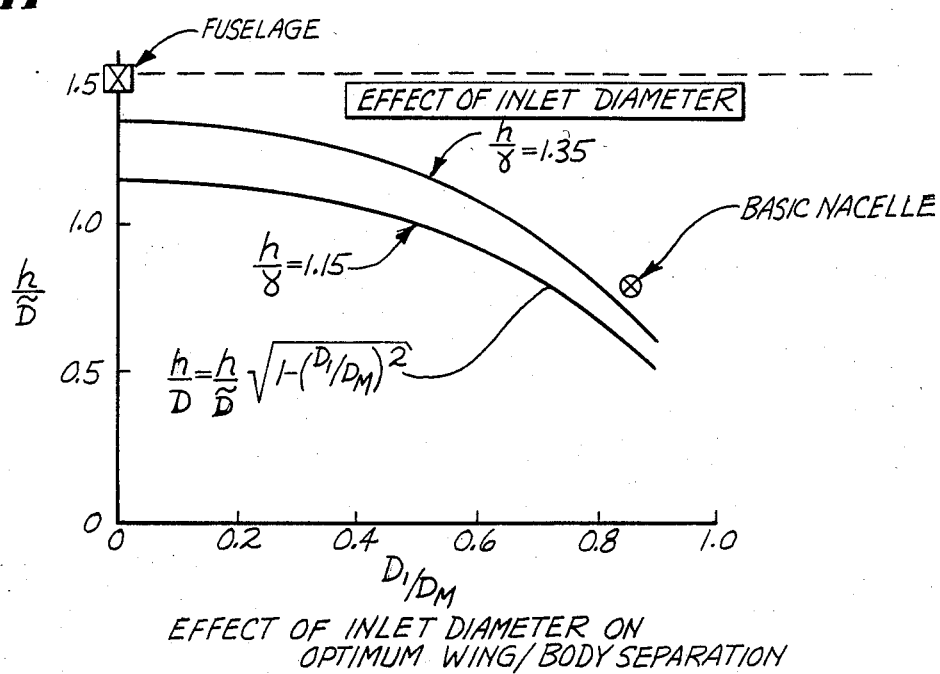
FIG. 11 illustrates the theoretical effect of body inlet area on optimum separation distance.

Turning now to FIGS. 3, 6 and 7, the wing top plan form of the favorable interference aircraft will be described. Considering first FIG. 6, a theoretical pressure distribution projected on a planar wing, 1.5 body diameters above a generalized body having a diameter D, is shown. This graphically illustrates the rapid pressure rise caused by the bow shock wave ($C_P>O$) as well as an area of negative pressure ($C_P<O$) downstream from the bow shock. It is desirable to substantially reduce this region of negative pressure to avoid an undesirable negative in the lift produced by the positive pressure areas. In FIG. 7, there is illustrated the top plan form of one of the two wings 18 with the pressure distribution caused by the bow shock wave from a nacelle 22, superimposed thereon. Substantially all of that portion of leading edge 38 of wing 18 that is outboard of nacelle centerline 36 substantially follows the curvature of the bow shock wave. To reduce the effects of the previously discussed negative pressure areas, the trailing edge 40 of wing 18 substantially follows the zero pressure coefficient line. In this manner, negative pressure effects are substantially reduced and significantly greater interference lift results. As clearly seen in FIGS. 3 and 8, that portion of leading edge 38 inboard of nacelle centerline 36 follows the curve established by the outboard portion and fairs smoothly into fuselage 12.

Turning now to FIGS. 3, to 5 and 8 to 11, the general shape, location and oriention of nacelles 22 will be discussed. Considering first FIGS. 8 and 9, the theoretical effect of parasol anhedral or lateral curvature on nacelle and body wave drag respectively is illustrated. As can be clearly seen the large body or fuselage must be located at a much greater distance below the wing than a nacelle to achieve maximum wave cancellation effects, i.e., where the ratio of the combined drag coefficient to the isolated drag coefficient is at a minimum. As may be clearly seen in FIGS. 5 and 9 the optimum location 35 for nacelle center line 36 is approximately 70 to 80 percent of the maximum nacelle diameter below the wing. This illustration also clearly indicates that nacelle wave drag can be reduced by approximately 10 to 40 percent, depending on the lateral curvature of the parasol wing.

As previously noted, to maximize the beneficial effects of multiple shock reflections it is desirable to have a minimum separation distance while at the same time achieving maximum wave drag cancellation. It has been discovered that nacelle fineness or slenderness ratio and inlet diameter have the theoretical effect illustrated in FIGS. 10 and 11, and the nacelles can be optimized accordingly.

Figure 12:
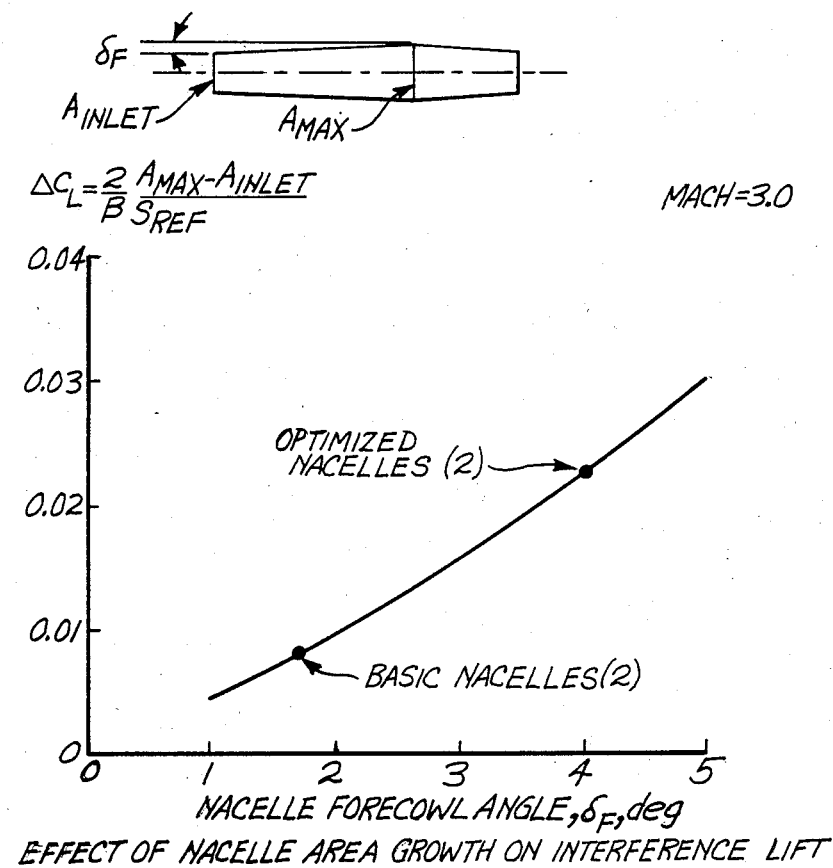
FIG. 12 illustrates the effect of nacelle area growth on interference lift and illustrates the meaning of the term fore cowl angle.

Since a basic large body or fuselage generates a more intense pressure field and thereby more interference lift than a basic nacelle, it is desirable to modify the nacelle to increase the pressure field and thereby produce an interference lift which more closely approximates that generated by the fuselage. One way this may be accomplished is to increase the fore cowl angle which is defined as the angle between the exterior surface of nacelle 22 immediately aft of the inlet and a horizontal line tangent to that point on the exterior surface of nacelle 22 where the diameter is at a maximum. Theoretical calculations, shown in FIG. 12, indicate an angle of about 4° to be optimum. Although such a design results in large negative pressures associated with the nacelle boat tail, at the Mach 3.0 design condition, this negative pressure field falls aft of the wing trailing edge and creates no adverse effects. At lower, off design Mach numbers the shock wave pattern from the nacelle moves forward on the wing, causing areas of negative pressure to fall thereon and would tend to reduce the interference lift at off design Mach numbers. A possible alternative aerodynamic solution is a non symetric nacelle design that matches the area growth of the top half of a nacelle modified to produce only positive pressures but has an exit area equal to the original nacelle.

There has thus been described an aircraft capable of extended range while cruising at supersonic Mach numbers through utilization of favorable aerodynamic interference effects. Variations and modifications will occure to persons skilled in the art without departing from the spirt and scope of the invention. Accordingly, it is intended the appended claims cover all such variations and modifications.

What is claimed is:

1. An aircraft capable of extended cruiseat high Mach numbers through utilization of favorable aerodynamic interference effects by mutual interaction of flow fields comprising:

a fuselage, area-ruled to optimize favorable interference effects and having a longitudinal center line defining a plane of symmetry;

a wing attached to said fuselage on opposite sides of said plane of symmetry, each wing having a lateral curvature extending from root to tip;

a jet power plant nacelle having an axial center line and a length substantially equal to the length of the local wing chord being suspended beneath each said wing;

each said wing forming a substantially parabolic lower reflection surface means for reflecting and redirecting portions of a shock wave pressure field generated by each said nacelle at supersonic speeds to produce lift, each reflection surface means comprises a parabolically curved inboard portion adjacent said root, a substantially planar central portion and a parabolically curved outboard portion adjacent said tip, the respective nacelle center line being located at the focus of each parabolically curved portion to maximize the shock wave pressure field generated by each nacelle.

2. An aircraft as defined in claim 1 wherein each nacelle has an inlet at one end and an outlet at the other, said nacelle having its outer surface contoured from inlet to outlet so as to maximize the pressure field and thereby the interference lift produced.

3. An aircraft as defined in claim 2, wherein said contour comprises the outer diameter of said each nacelle increasing from said inlet to a point of maximum diameter between said inlet and said outlet and then decreasing from said point of maximum diameter to said outlet.

4. An aircraft as defined in claim 3, wherein the angle of said nacelle outer surface between said inlet and said point of maximum diameter and a line tangent to said point of maximum diameter is approximately 4°.

5. An aircraft as defined in claim 1, wherein each wing, in top plan form, comprises a leading edge and a trailing edge;

that portion of said leading edge located generally outboard of said nacelle center line being shaped to substantially follow a curve formed by the projection of a bow shock generated by said nacelle at the aircraft design speed upon the plane of the respective wing;

that portion of said leading edge located generally inboard of said nacelle center line forming an extension of said outboard portion and extending to said fuselage along a parabolic curve having its focus on said aircraft center line;

said trailing edge being parabolically curved about a focus which lies on the mean aerodynamic chord of the respective wing to cut off negative pressure effects.

* * * * *